United States Patent [19]
Nogaki

[11] Patent Number: 5,195,390
[45] Date of Patent: Mar. 23, 1993

[54] PRECISION LINEAR MECHANICAL DRIVES

[76] Inventor: Hisami Nogaki, 6465 E. Camino Grande, Anaheim Hills, Calif. 92807

[21] Appl. No.: 583,113

[22] Filed: Sep. 14, 1990

[51] Int. Cl.$^5$ .................. E05F 11/34; F16H 25/12
[52] U.S. Cl. .................. 74/89.15; 74/424.8 R; 49/362
[58] Field of Search ............ 74/89.15, 441, 459, 74/424.8 R; 192/141; 292/251, 150; 49/362, 280, 449

[56] References Cited

U.S. PATENT DOCUMENTS

| | | | |
|---|---|---|---|
| 2,598,709 | 6/1952 | Morris | 74/424.8 R |
| 2,715,341 | 8/1955 | Hogan | 74/459 |
| 2,716,352 | 8/1955 | Wilson | 74/459 |
| 2,875,630 | 3/1959 | Gill et al. | 74/424.8 R |
| 3,719,005 | 3/1973 | Carli | 74/89.15 X |
| 4,198,786 | 4/1980 | Monot | 74/89.15 X |
| 4,250,762 | 2/1981 | Weatherby | 74/424.8 R X |
| 4,269,331 | 5/1981 | Watson | 74/424.8 R X |
| 4,605,108 | 8/1986 | Monot | 49/449 X |
| 4,819,743 | 4/1989 | Rousselot et al. | 74/424.8 R X |
| 4,821,456 | 4/1989 | Nogaki | 74/89.15 X |
| 5,077,938 | 1/1992 | Moreuil | 49/449 X |

Primary Examiner—Leslie A. Braun
Assistant Examiner—Khoi Q. Ta
Attorney, Agent, or Firm—Natan Epstein

[57] ABSTRACT

A mechanical drive for transporting a load attached to a load carrier element displaceable along a rotary threaded shaft between unthreaded ends of the shaft features precision end-of-travel positioning of the load and is improved to eliminate vibration of the load carrier element against the end of the thread on the rotating shaft thereby reducing wear of both the thread end and the load carrier.

24 Claims, 2 Drawing Sheets

PRECISION LINEAR MECHANICAL DRIVES

BACKGROUND OF THE INVENTION

1. Field of the Invention

The present invention pertains generally to linear mechanical screw drives for moving a load back and forth between two end-of-travel positions, such as in a door or gate actuating system, where the load is pulled by a load carrier element threaded on a rotary drive shaft between two unthreaded sections of the shaft. This invention improves the load carrier to resist a damaging vibration following disengagement of the load carrier at the unthreaded shaft sections as the carrier is urged by a biasing spring against the thread end of the rotating drive shaft. This invention also provides the drive shaft with oversized thread surfaces at the thread ends for enhanced wear resistance.

2. State Of The Prior Art

Linear mechanical drives of the screw type find wide application and are commonly adapted for opening and closing doors and sliding gates, such as remotely operated garage doors. One particular application for screw drives has been the remote actuation of roll-up type truck loading doors on cargo van and trailer truck doors. Roll-up doors are made of several panels hinged together along their horizontal edges and held between vertical slide tracks in a door opening, for holding the hinged panels in a flat vertical plane to close the door opening. The upper ends of the slide tracks curve to a horizontal position above the door opening such that pushing up on the door successively brings the panels to a horizontal out of the way position. Conventionally, such door actuating drives have included a worm gear or screw shaft mounted to the ceiling of the van/trailer cargo enclosure and driven by a reversible motor powered by the vehicle battery. A nut threaded on the screw shaft is displaced axially by rotation of the screw. The roll-up door is connected to and pulled by the nut between the opposite ends of threaded drive shaft. This general type of linear drive is well known and widely used. Difficulties have been encountered, however, in applications requiring precise positioning of the load at one or both ends of the drive shaft. Rotary inertia of the drive motor introduces a positioning error in systems which rely on timers or load position sensors to activate and deactivate the drive motor. More sophisticated systems capable of electronically sensing and accurately positioning the load are costly and require more complex installation wiring of the system. In applications such as truck door and garage door actuators it is desirable to minimize the cost and complexity of the system without, however, sacrificing reliability. A continuing need exists for simple drive systems capable of long term reliability and load positioning accuracy with minimal maintenance, particularly in difficult environments such as cargo compartments of transport vehicles where the drive system is exposed to severe vibration, shock, ambient temperature extremes, humidity and moisture.

U.S. Pat. No. 4,821,456 issued Apr. 18, 1989 to this applicant for a Linear Mechanical Drive With Precise End-of-Travel Load Positioning, disclosed a mechanism featuring a drive shaft with a male threaded shaft section intermediate two smooth unthreaded shaft sections. The drive shaft is mounted to a supporting structure and is turned by a reversible motor drive. An internally threaded load carrier unit is axially displaceable along the drive shaft from one to another of the two unthreaded shaft sections in response to rotation of the drive shaft. The load carrier disengages from the shaft thread at each of the unthreaded sections to positively stop axial movement and precisely determine the end-of-travel positions of the carrier and any load connected to the same, irrespective of continued drive shaft rotation. The load carrier in its disengaged condition at each unthreaded section of the shaft is spring biased into contact with the drive shaft thread, to maintain the load carrier ready for re-engagement with the shaft thread when rotation of the shaft is subsequently reversed, to then pull the load back in the opposite direction along the drive shaft.

Because of inertia inherent in the motor drive which turns the threaded shaft, the shaft usually continues to rotate for some time following disengagement of the load carrier unit at one or the other of the unthreaded sections of the shaft. When this occurs the load carrier vibrates, reciprocating back and forth a short distance along the drive shaft. This happens because with each revolution, at a certain relative angular position between the male and female thread ends, the end of the male thread on the shaft is free to advance about a quarter pitch into the female thread of the load carrier, and the spring bias drives the load carrier against the end of the male thread. As the shaft turns the male thread then withdraws from the female thread. This process repeats with each revolution of the shaft and causes undesirable vibration and damage to the parts of the mechanism. As the thread pitch increases, so does the distance by which the shaft thread is able to penetrate the carrier, and the greater the impact of the load carrier against the end of the shaft thread. This spurious vibration becomes particularly severe in the large pitch thread drive shafts used in door openers in trucks and vans, garages, and the like.

One prior solution to this difficulty, described by this applicant in the aforementioned '456 patent, consists of a thread follower attached to the load carrier which remained in engagement with the shaft thread and also maintained the load carrier spaced from the end of the shaft thread following disengagement of the load carrier. The load carrier was thus unaffected by continued rotation of the drive shaft, yet was pulled into re-engagement by the thread follower once the drive shaft was turned in the opposite direction. While this approach works well, it introduces some vibration into the system because the thread follower is a spring which snaps over the shaft thread with each revolution of the shaft.

Further improvement is desirable to prevent or minimize spurious reciprocal motion and vibration of the load carrier against the shaft thread, and to reduce wear on both the load carrier and the shaft thread for maintaining precise load positioning and extending the service life of the mechanism.

SUMMARY OF THE INVENTION

This invention addresses the aforementioned need by providing an improved load carrier for a mechanical drive of the type where a load carrier with a female thread is displaceable along a male threaded drive shaft between two unthreaded shaft sections responsive to rotation of the shaft in a first sense such that the interior thread of the carrier disengages from the shaft thread at the unthreaded sections, where a spring biases the load carrier against the thread end of the drive shaft for reengagement with the male thread when shaft rotation is reversed to an opposite sense.

In the improvement of this invention the load carrier is fitted with a retractable detent which stops the male thread of the drive shaft from striking of the load carrier's female thread during continued shaft rotation following disengagement of the male and female threads at the unthreaded sections of the drive shaft. The detent is mounted at the end opening of the interior thread of the load carrier and is biased by a detent spring to an extended, operative position in which the detent end projects below the crest of the drive shaft thread, preferably against the root of the drive shaft thread. The circumferential position of the detent in the end opening is generally opposite to the thread end surface generated by the sectioning of the female thread by the end face of the carrier at the end opening of the female thread. This thread end surface in part defines the end opening of the female thread and may be flush with the end surface of the load carrier. The detent may be a rectangular blade and has a lower edge which in the extended position lies in axial interference with the leading bearing surface of the shaft thread and obstructs entry of the male thread into the interior thread of the carrier.

The detent is retractable from its extended position in the end opening upon reversal of shaft rotation to the opposite sense for reengagement of the carrier with the shaft thread. The detent is retracted by the end of the shaft thread as it advances towards mating engagement with the interior thread. The detent is positioned such that, when the shaft turns in the opposite sense to advance the male thread towards the interior thread, the detent rides up along the tapered end of the male thread onto the crest of the shaft thread, retracting against the bias of the detent spring to admit the male thread into the load carrier. Once retracted, the detent slides on the crest along the length of the male thread until the load carrier again disengages at one of the unthreaded section of the drive shaft, where the detent drops to its extended position to protect the threads against mutual impact.

The detent is also retractable from the extended operative position when the end of the shaft thread approaches the rear of the detent through the interior thread from the opposite end opening in the load carrier. The detent has on its rear side a bevel surface which is inclined to the shaft axis. As the end of the shaft thread pushes against the bevel surface, the detent reacts by sliding up along the end of the male thread and onto the crest of the shaft thread, allowing the load carrier to move along the shaft thread.

The load carrier is preferably provided with two such detents, mounted back to back at opposite ends of the load carrier, in the opposite end openings of the interior thread. The two detents in such installation operate in similar manner but are independent of each other. Each detent protects the corresponding side of the carrier against impact with the male thread of the drive shaft. If desired, a single detent can be provided at either end of the interior thread.

Another improvement according to this invention is the provision of a male thread end segment on the drive shaft. The end segment is a generally helical structure, defining one or more thread turns, sized to fit over an unthreaded section of the drive shaft contiguously with the end of the original shaft thread. The end segment thread has a diameter greater than the original drive shaft. The enlarged diameter of the end segment is accommodated by a correspondingly large diameter of the interior thread of the load carrier. However, the pitch and the root diameter of the end segment are the same as the original male thread of the drive shaft so as to mate with the female thread of the load carrier.

The end segment can provide a greatly increased thread bearing surface at the end of the shaft thread, which is heavily stressed during initial, partial mating of the male and female threads. A small end portion of the shaft thread may engage and pull the full load attached to the load carrier, and thereby suffer accelerated wear in relation to the more central portions of the shaft thread. Similar accelerated wear may occur at the end portions of the interior thread of the load carrier. The enlarged bearing surfaces better distribute this initial stress until fuller mating engagement occurs between the shaft thread and carrier thread, whereupon the load becomes more widely distributed over a greater length of thread. The enlarged end surface also better distributes the friction between the end surface of the male thread against the end face of the load carrier under spring bias following disengagement of the carrier from the shaft thread.

The oversized end segment can be made of a hardened material or chrome-plated metal to thereby further increase the strength and wear resistance of a softer metal shaft, such as an aluminum shaft.

These and other improvements and benefits of the present invention will be better understood by reference to the following detailed description of the preferred embodiments and the attached drawings.

DETAILED DESCRIPTION OF THE PREFERRED EMBODIMENTS

Figure 2:
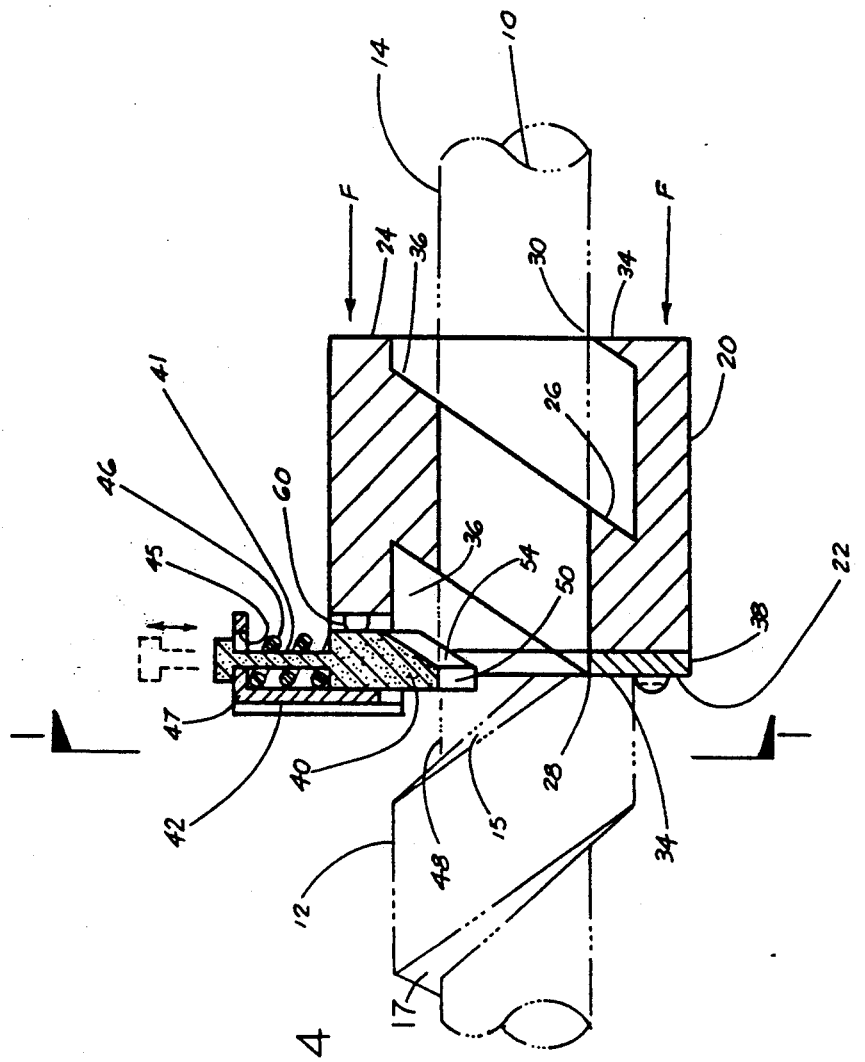
FIG. 2 a longitudinal section of the improved load carrier, taken along line 2—2 in FIG. 1, the load carrier being shown on an unthreaded section of the drive shaft, the drive shaft being shown in phantom lining.
Figure 6:
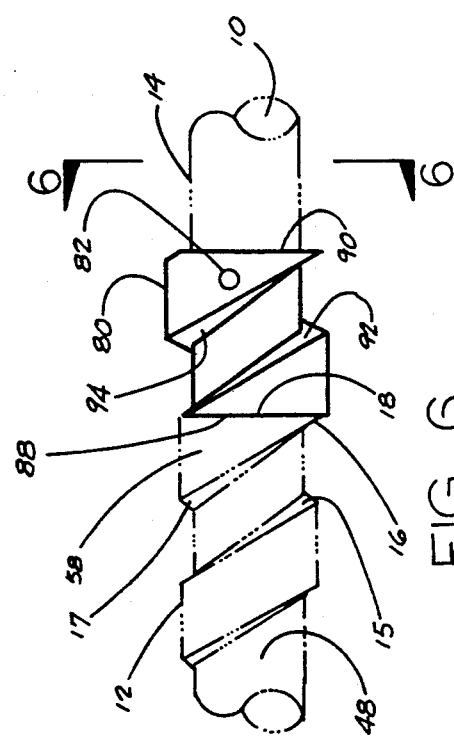
FIG. 6 is a longitudinal side view of a threaded drive shaft fitted with an oversize thread end segment according to this invention.
Figure 5:
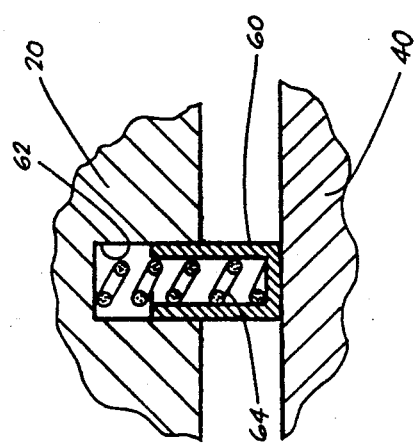
FIG. 5 is a detail section of the angular biasing arrangement of the detent.
Figure 7:
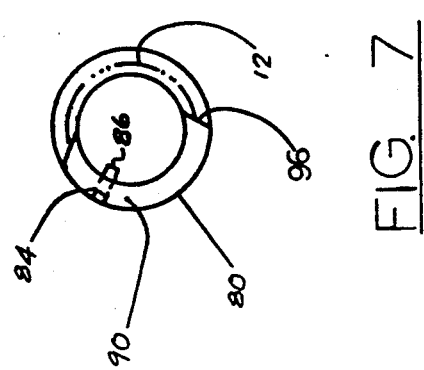
FIG. 7 is an end view of the drive shaft taken along line 6—6 in FIG. 6.

With reference to the drawings, FIG. 2 shows a drive shaft 10 with a screw thread 12 ending at a smooth, unthreaded shaft section 14. The thread 12 extends to the left of FIG. 2 and may terminate at a second unthreaded shaft section, but is not shown in the drawings for purposes of the following explanation. The shaft 10 is coupled to a reversible motor drive (not shown) designed to rotate the shaft 10 in either one of two opposite senses indicated by arrows A and B in FIG. 1. As best seen in FIG. 6, the shaft thread 12 has a leading and a trailing helical bearing surface 15, 17 respectively, which meet at an end point 16. FIG. 6 shows the shaft 10 in phantom lining and also illustrates, in solid lining, an end segment 80 which is an aspect of this invention addressed below. The leading bearing surface 15 includes a male thread end surface 18 adjacent to the end point 18. The thread end surface 18 is perpendicular to the shaft axis and is planar over approximately ¼ turn of the shaft thread, receding thereafter as the helical leading bearing surface 15. The crest of the male thread 12 ends at an end edge where the leading and trailing bearing surfaces 92, 94 intersect at the end point 16. This end edge, which connects the root surface 48 with the crest surface 58 on the shaft 10, is not shown for the original thread 12 of the shaft 10, but a corresponding end edge 96 is shown in FIG. 7 for the end thread segment 80.

A load carrier 20 is a generally rectangular block with an end face 22 oriented towards the shaft thread 12 and an opposite rear face 24. An interior thread 26 extends between two opposite end openings 28, 30 in the faces 22, 24 respectively.

The interior thread 26 terminates at each end opening 28, 30 in a female end surface 34 generated by transverse section of the interior thread 26 in a plane perpendicular to the thread axis at the faces 22, 24 of the load carrier block. The end surfaces 34 partly define each end opening 28, 30 and are flush with the respective end faces 22, 24. Diametrically opposite the end surface 34 each end opens to the maximum diameter of the interior thread 26.

A biasing spring (not shown) provides a bias force indicated by arrows B in FIG. 2 operative for urging the load carrier 20 against the leading bearing surface 15 and end surface 18 of the shaft thread 12.

The general purpose and operation of the mechanism has already been described in the introductory portion of this specification. For a fuller description, reference is made to this applicant's U.S. Pat. No. 4,821,456. To summarize for purposes of the following explanation, the load carrier 20 is held against rotation about the shaft axis by suitable means (not shown) and is displaced along the drive shaft 10 by rotation of the shaft. A load can be attached and pulled by the carrier 20 along the drive shaft. Rotation of shaft 10 in sense A drives load carrier 20 onto the unthreaded section 14 until the interior thread 26 disengages from the shaft thread 12.

As a practical matter, the drive shaft 10 continues to rotate in sense A for some time after the carrier 20 has disengaged at the unthreaded section 14. During such continuing rotation, the carrier is urged by bias force B against the end surface 18 of the shaft thread 12. The end surface 18 sweeps through a circular path, alternately over the end surface 34 and the cavity defined by the maximum diameter side of the end opening 28. The female end surface 34 stops the male thread 12 against entry into the female thread 26. However, when the male end surface aligns with the maximum diameter side of the end opening 28 it is free to enter the female thread 26 until the leading bearing surface 15 makes contact with the end surface 34 of the female thread. This contact occurs at a point of the leading bearing surface 15 which is approximately diametrically opposed to the end point 16. This contact point is axially spaced from the end point 16, allowing the carrier 20 to travel a short distance, approximately ¼ of the thread pitch, along the shaft 10 to the left in FIG. 2. The load carrier 20 impacts against the leading bearing surface 15 of the male thread with the force of the spring bias B As the drive shaft 10 then continues its revolution, the leading bearing surface 15 reacts against the end surface 34 to push the carrier 20 away onto the unthreaded section 14 until the end point 16 withdraws from the end opening 28 and again sweeps over the thread end surface 34 on the load carrier. This process repeats with each revolution of the drive shaft 10 and causes the load carrier 20 to hammer against the drive shaft thread 12 at high frequency. For purposes of the following explanation however, reference is occasionally made to the shaft thread advancing into the load carrier or striking the carrier; it should be understood that this advance or striking is relative between those two elements only and not in reference to any external structure. In most installations the shaft is axially fixed and the carrier is axially displaceable.

Figure 4:
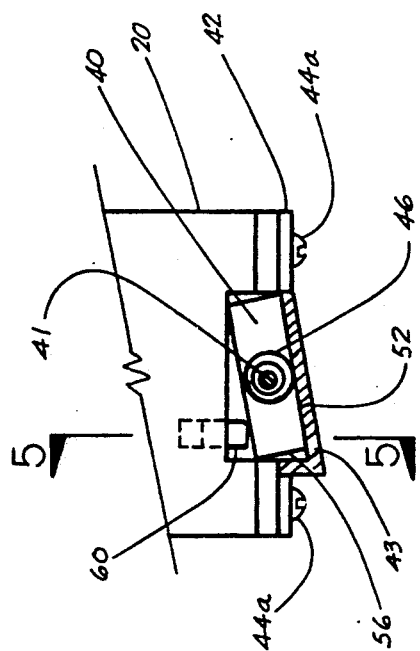
FIG. 4 a section of the detent assembly of the load carrier taken along line 4—4 in FIG. 2.

This problem is overcome by providing the load carrier 20 with a detent 40 supported in a mounting bracket 42 which is fixed to the load carrier by means of fasteners 44a. The mounting bracket 42 includes a top flange 47 with a hole 45. The detent 40 is attached to the lower end of a neck 41 reciprocable in the hole 45 for movement of the detent 40 between the extended position shown in solid lining, and a retracted position indicated in phantom lining in FIGS. 1 and 2. The detent 40 below the neck 41 is a generally rectangular blade as seen in front elevation in FIG. 1, with a rectangular cross section as seen in FIG. 4. The lower edge 50 of the detent 40 is a relatively thin edge defined between plane front surface 52 and a rear bevel surface 54. The lower edge 50 of the detent 40 is arcuately shaped to conform to the curvature of the shaft root surface 48. A helical spring 46 held in compression between the flange 47 and detent 40 biases detent 40 to the extended position. In the extended position the detent 40 projects into the end opening 28 and the lower edge 50 of the detent makes contact with the root 48 of the shaft thread 12, in axially interfering relationship with the leading surface 15 of the shaft thread 12. A face plate 38 secured to carrier 20 by fasteners 44b defines the end face 22 and extends over the female end surface 34 for reinforcement.

Figure 1:
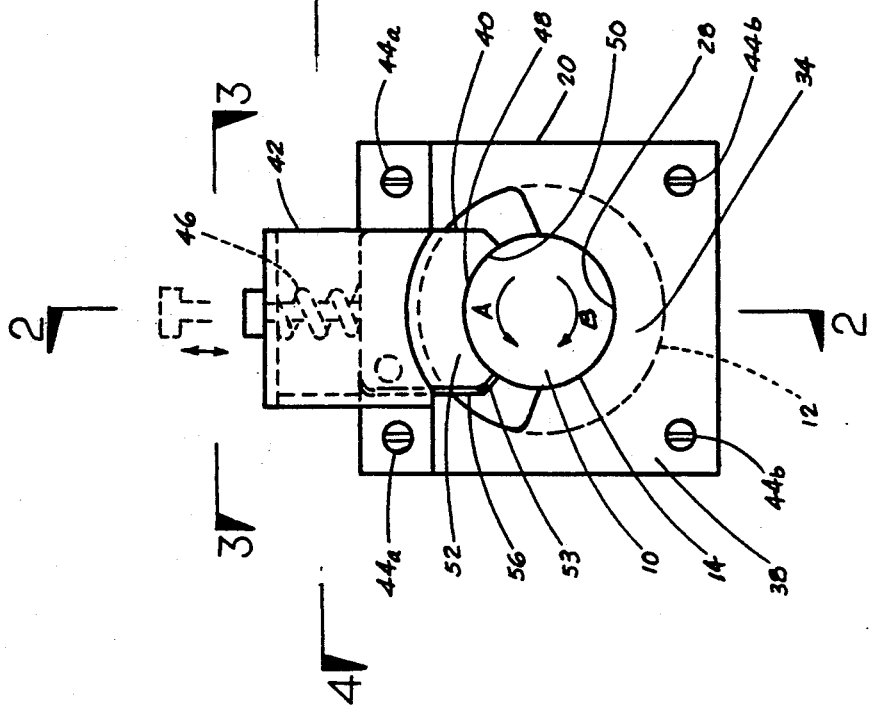
FIG. 1 is an end view of the improved load carrier, the drive shaft being shown in section taken along line 1—1 in FIG. 2.
Figure 3:
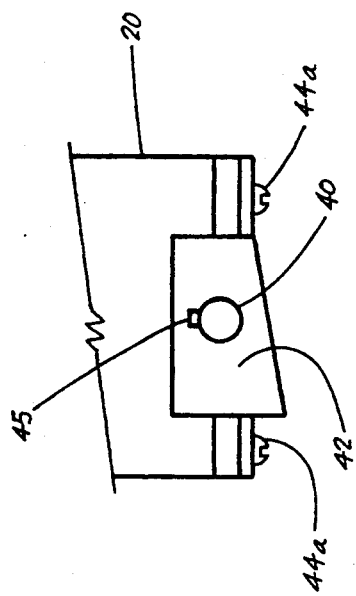
FIG. 3 a fragmentary top plan view of the detent assembly of the load carrier seen along line 3—3 in FIG. 1.

The detent 40 is positioned circumferentially opposite to the end surface 34 of the interior thread 26 in the end opening 28, as best seen in FIG. 1, so as to contact the leading bearing surface 15 of the shaft thread 12 at a point which is approximately diametrically opposed to the lead point 16 and consequently stops the load carrier 20 from advancing onto and striking the shaft thread 12. The detent contact is approximately at the same point of the leading bearing surface 15 which would otherwise strike against the end of the interior thread. The detent thus obstructs the side of the end opening 28 which is opposite to the end thread surface 34 to hold the carrier against the bias force B which would otherwise drive the two threads against each other with every revolution of the shaft thread, as explained above. The outer surface 52 of the detent 40 thus complements and cooperates with the thread end surface 34 of the interior thread 26 to prevent entry of the shaft thread into the end opening 28 of the load carrier so long as the drive shaft 10 turns in sense A, to prevent impact of the shaft thread 12 against the interior thread 26 of the load carrier.

As best seen in FIG. 4, the forward face 52 of the detent 40 is held against an angled center section 43 of the mounting bracket 42 by a pin 60 set in a blind bore 62 and biased against the rear of the detent 40 by a spring 64 compressed between the interior of the pin 60 and the bottom of the blind bore 62. The outer end of the pin 60 pushes against the detent 40 at a point near the side 56 so as to keep the detent 40 at the angle set by the mounting bracket section 43. The angle of the detent 40 to the shaft axis is approximately 5 to 15 degrees in the same direction as the thread angle of the shaft thread 12. One side edge 56 of the detent 40 projects beyond the end surface 34 of the female thread 26, with the lower corner 53 of the detent positioned in alignment with the position at which the end point 16 of the shaft thread enters the opening 28 as it advances towards mating engagement with the interior thread 26 after shaft rotation has reversed to sense B. When this occurs, the ramp surface of the shaft thread trailing the end point 16 will move under the lower edge 50 and raise the detent 40 out of the end opening 28 against the bias of spring 46 to the recessed position indicated in dotted lining in FIGS. 1 and 2. In this recessed position the lower edge 50 of the detent 40 slides against and rides on the crest 58 of the shaft thread under the bias of spring 46 and does not interfere with displacement of the load carrier 20 along the shaft thread 12. The opposite side edge 57 of the detent is spaced away from the end point 16 and allows the end point to sweep over the front surface 52 of the detent during shaft rotation in sense A. With each revolution, the end point 16 pushes back the projecting side edge 56 against the bias of spring 64, driving the pin 60 into its bore 62, so that the detent 40 is pushed flat against the back surface 63 and does not obstruct smooth rotation of the shaft. Thus, to summarize, for rotation in sense B, the end point 1 6 engages the lower corner 53 of projecting side edge 56 of the detent to lift the detent to the retracted position; for sense A rotation, the trailing side edge 57 of the detent allows the end point 16 to sweep across the front surface 52 of the detent and to push the projecting side 56 out of its path.

After drive shaft rotation reverses to the sense B in FIG. 1, the thread end point 16 of the shaft re-enters the end opening 28 and re-engages the interior thread 26 thus pulling the carrier 20 back onto the thread 12 and down the shaft towards its opposite end. In a typical installation the opposite end of the shaft thread 12 (not shown in the drawings) terminates in an end point similar to point 16 in FIG. 7 at a second unthreaded shaft section analogous to section 14 in FIG. 2. There, the load carrier 20 will again disengage from the thread 12, and will remain under spring bias towards re-engagement with the thread 12 in a manner similar to that described in connection with FIG. 2. When the shaft rotation is then again reversed to sense A, the thread point will enter the end opening 30 in the rear face 34 of the load carrier and the interior thread 26 will again mate to the shaft thread 12, pulling the load carrier 20 onto the thread. The thread end point moves through the interior thread 26 and engages the rear bevel surface 54 of the detent 40. The upper edge of the trailing bearing surface 17, (which now leads the male thread 12) pushes against the bevel surface which reacts by sliding upwardly raising the detent 40 out of the way to its retracted position where it rides sliding along the crest 58 of the shaft thread 12 until the carrier again disengages from the thread at one of the unthreaded sections 14 of the shaft, whereupon the detent 40 will again drop to the extended position shown in FIGS. 1 and 2 under urging of the bias spring 46.

From the foregoing, it is thus seen that the detent 40 is characterized by three functional features:

1) The detent 40 will drop to the extended position whenever the load carrier 20 disengages from the shaft thread 12 and in that position will prevent reciprocating motion of the load and striking of the shaft thread end point 16 against the carrier's interior thread 26 while the drive shaft continues to turn in the sense which brought about the disengagement;

2) The detent is pushed to a retracted, out of the way position when the shaft reverses rotation to a sense conducive to mating re-engagement of the male thread 12 with the interior thread 26 of the load carrier 20, allowing penetration of the thread 12 into the load carrier; and 3) The detent 40 will also be pushed out of the way to its retracted position by the shaft thread 12 advancing against the rear side of the detent through the interior thread 26 from the opposite end opening of the load carrier 20.

For clarity of illustration and simplicity of explanation the detent 40 has been shown mounted to only one side of the load carrier 20 in the drawings. In a preferred form of the invention however, the load carrier 20 will be provided with a similar detent 40 and associated components at the opposite end opening 30 in rear face 34, to protect both ends of the interior thread 26.

Yet another feature of this invention is shown in FIGS. 6 and 7. An end thread segment 80, shown in solid lining in FIG. 7, consists of a single thread turn formed as a helical piece which can fitted axially onto the unthreaded section 14 of the drive shaft 10. The thread segment 80 is affixed to the drive shaft 10 by a set screw 82 threaded in a radial bore 84 which may align with a blind bore 86 in the drive shaft 10. The thread segment 80 has opposite flat end surfaces 88, 90 perpendicular to the thread axis. The end surface 88 abuts against the flat end surface 18 of the original shaft thread 12 and the thread segment 80 is keyed by set screw 82 such that the thread segment 80 is a continuation of the original shaft thread 12. The maximum diameter of the thread segment 80 is greater than the maximum diameter of the original thread 12 integral to the drive shaft 10. The maximum diameter is the diameter of the thread measured at the crest 58 of the thread 12. The enlarged diameter of thread segment 80 provides a consequent enlargement of the leading and trailing thread bearing surfaces 92, 94 respectively, in comparison to the bearing surfaces 15, 17 of the shaft thread 12. For example, for ⅜ inch thread the effective contact area of the bearing surface 15 of the shaft thread 12 with corresponding bearing surface of the load carrier 20 is approximately 0.122 square inch per pitch or turn of the thread. If the end segment 80 has a 1 ¼ (1.25) inch thread diameter, the bearing surfaces 92, 94 are considerably greater. In particular, it is desirable to make the flat end surface 18 of the shaft thread 12 as large as possible, in order to distribute the friction and impact forces on the end face 22 of the load carrier 20 over as large an area as possible to minimize wear and damage. With a 1 and ¼ inch diameter end thread segment 80 on a ⅝ inch shaft 10 with an original ⅜ inch thread 12, the area of end surface 90 is approximately 680% larger than that of the end surface 18 of the original shaft thread 12. The interior thread 26 of the load carrier has a maximum thread diameter slightly greater than that of the end segment 80 in order to admit the thread segment 80. The root diameter or inside diameter of the end thread segment 80 is the same as the root diameter of the original thread 12 at surface 48. Thus, the minimum diameter of the inside thread 26 remains unchanged and is slightly greater than the root diameter of the thread 12 on the shaft 10. Likewise, the thread pitch of the thread segment 80 matches the pitch of the original shaft thread 12. The segment 80 threaded into the carrier 20 will fill the interior thread in the load carrier 20. After the enlarged segment 80 has passed through the load carrier the original shaft thread 12 will readily mate with the interior thread 26 and will engage normally except that an empty helical void will remain between the crest 58 of the thread 12 and the maximum diameter of the interior thread 26. This void does not materially impair operation of the drive mechanism. The oversized bearing surfaces 90, 92 provided by the end segment 80 better distribute the load on the load surfaces of the interior thread 26 particularly during initial, partial engagement between the end segment 80 with the interior thread 26, when pulling force on the carrier 20 is initially confined to a relatively small portion of the interior thread 26.

While particular embodiments of the invention have been shown and illustrated for purposes of clarity and explanation, it must be understood that many changes, modifications and substitutions will be apparent to those possessed of ordinary skill in the art without thereby departing from the spirit and scope of the present invention which is defined by the following claims.

What is claimed is:

1. In a mechanical drive of the type where a load carrier has an interior thread mated to a threaded drive shaft and the load carrier is linearly driven by rotation of the shaft between two unthreaded shaft sections, the interior thread of the carrier disengaging from the shaft thread at said unthreaded sections responsive to shaft rotation in a first sense and having means urging the carrier against the shaft thread for reengagement therewith upon subsequent shaft rotation in an opposite sense, the improvement comprising:

detent means on said carrier for stopping said shaft thread against entry into said internal thread under said urging during shaft rotation in said first sense following disengagement of said threads at said unthreaded sections to thereby prevent impact between said interior thread and said shaft thread, said detent means being retractable upon reversal of shaft rotation to said opposite sense for admitting reengagement of said carrier with said shaft thread.

2. The improvement of claim 1 wherein said interior thread ends in an end opening at an end face of said carrier, said end opening defined in part by a thread end surface of said interior thread, said detent means extending into said end opening generally radially opposite said thread end surface.

3. The improvement of claim 1 wherein said detent means is movable between an extended and a retracted position, and further comprising spring means biasing said detent means towards said extended position for engagement with said shaft thread.

4. The improvement of claim 2 wherein said detent means is movable between an extended and a retracted position, and further comprising spring means biasing said detent means towards said extended position for engagement with said shaft thread.

5. The improvement of claim 1 wherein said interior thread extends between end openings in opposite faces of said carrier, each said end opening defined in part by an end surface of said interior thread, said detent means including a detent extending radially into each said end opening.

6. The improvement of claim 5 wherein said detent means are retractable from either of said end openings by said shaft thread advancing through said interior thread from the opposite end opening.

7. The improvement of claim 5 wherein each said detent means are retractable from either of said end openings by said shaft thread advancing into mating engagement with said interior thread for reengagement with said carrier.

8. In a mechanical drive of the type where a load carrier has an interior thread between opposite end openings, each opening defined in part by an end surface of the interior thread, said carrier movable along an externally threaded rotary shaft between unthreaded sections of said shaft, the carrier disengaging from the shaft thread at said unthreaded sections against carrier biasing means urging the carrier against said shaft thread for reengagement therewith upon subsequent reversal of shaft rotation, the improvement comprising:

detent means on said carrier arranged in one or both of said end openings of said interior thread, spring means biasing said detent means into axially interfering relationship with said shaft thread for preventing reciprocating motion of the carrier against said shaft thread under urging of said carrier biasing means during continued shaft rotation following disengagement of the carrier at one or both said unthreaded sections, said detent means having a front surface and an opposite rear surface, said detent means being retractable against said spring means by said shaft thread advancing towards either said front or rear surfaces for reengagement with said carrier.

9. The improvement of claim 8 wherein said detent means extend generally radially into said one or both of said end openings 10. The improvement of claim 8 wherein shaft thread has a leading bearing surface and said detent means have a lower edge adapted to project into axially interfering relationship with said leading bearing surface to stop advance of said shaft thread under said urging into said interior thread during continued shaft rotation following disengagement of the carrier at one or both of said unthreaded sections.

11. The improvement of claim 9 wherein said end opening is partly defined by a thread end surface of said interior thread and said detent means is located circumferentially opposite said thread end surface in said end openings.

12. In a mechanical drive of the type where a load carrier is threaded onto a shaft and is driven by rotation in a first sense of the shaft towards an unthreaded section of the shaft, the carrier disengaging from the shaft thread at said unthreaded section against bias means urging the carrier towards reengagement with said shaft thread upon subsequent reversal of shaft rotation to an opposite sense, the improvement comprising:

a detent mounted on said carrier for engaging an end surface of said shaft thread thereby to obstruct advance of said shaft thread into said carrier during continued shaft rotation following disengagement of the carrier at said unthreaded section to stop reciprocating motion of the carrier against said shaft thread under said urging, said detent being configured and positioned to move onto the crest of the shaft thread to admit passage of said shaft thread for engagement with said load carrier upon said subsequent reversal of shaft rotation.

13. In a mechanical drive of the type where a load carrier is threaded onto a shaft and is driven by rotation in a first sense of the shaft towards an unthreaded section of the shaft, the carrier disengaging from the shaft thread at said unthreaded section against bias means urging the carrier towards reengagement with said shaft thread upon subsequent reversal of shaft rotation to an opposite sense, the improvement wherein:

said shaft thread includes a thread end segment on said shaft, said segment having a thread diameter substantially greater than said shaft thread and pitch equal to that of said shaft thread, said interior thread of the carrier having a maximum diameter sized for receiving said end thread segment and a pitch adapted to mate with said shaft thread.

14. The improvement of claim 13 wherein said end thread segment includes at least one thread turn.

15. The improvement of claim 13 wherein said end thread segment is a separate piece fitted on said shaft.

16. The improvement of claim 15 wherein said segment is of a harder material than said shaft.

17. The improvement of claim 15 wherein said segment is treated for enhanced surface hardness.

18. The improvement of claim 15 wherein said segment is chrome plated treated for enhanced surface hardness.

19. The improvement of claim 15 wherein said segment is fastened to said shaft by one or more set screws threaded in radial bores through said segment into engagement with said shaft.

20. In a mechanical drive of the type where a load carrier is threaded onto a shaft and is driven by rotation in a first sense of the shaft towards an unthreaded section of the shaft, the carrier disengaging from the shaft thread at said unthreaded section against bias means urging the carrier towards reengagement with said shaft thread upon subsequent reversal of shaft rotation to an opposite sense, the improvement wherein:

an end thread segment including at least one thread turn fitted on said shaft continuously with said shaft thread, said end thread segment having a thread diameter substantially greater than said shaft thread and pitch equal to that of said shaft thread, said interior thread of the carrier having a maximum interior diameter sized for receiving said end thread segment and a pitch adapted to mate with said shaft thread.

21. The improvement of claim 20 wherein said segment is of a harder material than said shaft.

22. The improvement of claim 20 wherein said segment is treated for enhanced surface hardness.

23. The improvement of claim 20 wherein said segment is chrome plated treated for enhanced surface hardness.

24. The improvement of claim 20 wherein said segment is fastened to said shaft by one or more set screws threaded in radial bores through said segment into engagement with said shaft.

* * * * *